(12) United States Patent
Montierth et al.

(10) Patent No.: US 8,355,157 B1
(45) Date of Patent: *Jan. 15, 2013

(54) METHOD AND APPARATUS FOR STORING DEMONSTRATION PAGE INFORMATION IN AN IMAGING DEVICE

(75) Inventors: Mark D. Montierth, Meridian, ID (US); Randall D. Briggs, Boise, ID (US); Douglas G. Keithley, Boise, ID (US); David A. Bartle, Boise, ID (US)

(73) Assignee: Marvell International Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 13/424,188

(22) Filed: Mar. 19, 2012

Related U.S. Application Data

(63) Continuation of application No. 11/957,213, filed on Dec. 14, 2007, now Pat. No. 8,144,358.

(60) Provisional application No. 60/871,028, filed on Dec. 20, 2006.

(51) Int. Cl.
G06F 15/00 (2006.01)
G06K 1/00 (2006.01)
G06K 15/00 (2006.01)

(52) U.S. Cl. ..................... 358/1.16; 358/1.17
(58) Field of Classification Search .................. None
See application file for complete search history.

(56) References Cited

U.S. PATENT DOCUMENTS 7,455,219 B2 11/2008 Langlotz et al.
2005/0105721 A1 5/2005 Ono

OTHER PUBLICATIONS

U.S. Appl. No. 11/957,213, filed Dec. 14, 2007, Mark D. Montierth et al., "Providing Demonstration Page Information in an Imaging Device", 32 pages.

*Primary Examiner* — Douglas Tran

(57) ABSTRACT

Imaging devices incorporating semi-volatile NAND flash memory are described herein. According to various embodiments, demonstration page information may be stored in the semi-volatile NAND flash memory, which may be reused and incorporated back into the memory pool after the demonstration page information is no longer needed. Other embodiments may be described and claimed.

15 Claims, 4 Drawing Sheets

METHOD AND APPARATUS FOR STORING DEMONSTRATION PAGE INFORMATION IN AN IMAGING DEVICE

CROSS REFERENCE TO RELATED APPLICATIONS

This application is a continuation of U.S. patent application Ser. No. 11/957,213, filed Dec. 14, 2007, which claims the benefit of U.S. Provisional Application No. 60/871,028, filed Dec. 20, 2006, entitled "Method for Providing Demo Pages in a Printer," the entire disclosures of which are hereby incorporated by reference in its entirety for all purposes.

TECHNICAL FIELD

Embodiments of the present invention relate to the field of printing, and more specifically, to the use of semi-volatile memory to store demonstration page information in an imaging device.

BACKGROUND

Increases in technology have led to printers incorporating the functionality of other devices such as faxes, copiers, and scanners. These multi-function peripherals typically include print, scan, copy, and fax mechanisms and the electronics to control their functionality. Throughout the application printers and multifunction peripherals may be referred to, collectively, as imaging devices or imaging apparatuses. The electronic controller portion of the imaging devices, among other things, may receive image data from an image source, and decompose the image data into pixels to be output onto output media. In receiving and processing the image data, the imaging devices necessarily utilize both volatile and non-volatile memory technology. The volatile memory portions are typically implemented with Dynamic Random Access Memory ("DRAM") or Static Random Access Memory ("SRAM"), while the non-volatile memory portions are typically implemented with Read Only Memory ("ROM"), Flash Memory, One Time Programmable memory ("OTP"), or Electrically Erasable Programmable Read-Only Memory ("EEPROM").

The decision to store data in volatile or non-volatile memory often depends on whether the information requires short term or long term retention. For instance, the non-volatile memory portions generally store information and data which is needed for the life of the imaging device, such as but not limited to firmware and Universal Serial Bus ("USB") identifiers. In contrast, volatile memory, with its more durable and faster write cycles, is typically used for buffering incoming I/O data, storing intermediate decomposed data, and implementing the processor stack. Additionally, a decision to utilize non-volatile or volatile memory may also depend on the frequency of expected writes to the device. This is because non-volatile memory typically has wear out characteristics that manifest with a large number of writes While increases in memory are required as the functionality of devices grow, increases in memory may also provide additional benefits such as storage for demonstration pages and imaging device drivers.

Consumer-grade imaging devices are often sold and marketed off the shelf at retail stores. These imaging devices must compete with other manufacturers' products which are frequently displayed adjacent to one another. As a metric of quality, these imaging devices print demonstration pages. The demonstration pages are often stored in the non-volatile memory and consume valuable space in memory. In particular, color images or color image data requires large amounts of memory. Once the imaging device is sold, the space is largely wasted. In efforts to reduce the wasted resources, prior art devices have reduced the number of images stored, stored only low-resolution demonstration pages, or provided a complex and expensive demonstration module with the image devices. Each of these has disadvantages which, consequently, harm the consumer's impression of the imaging device.

Device drivers are required by computers or host devices in order to successfully send pages to the imaging device. This is particularly true when a computer or host is required to calculate the pixels or raster to be printed. This process is often referred to as host-based rendering. Typically, imaging device drivers are provided on Compact Disks ("CDs") provided with the imaging device. This requires users to load the CD onto the host device in addition to connecting the imaging device. Many potential customers find the technical complexity associated with installing device drivers challenging and intimidating. Additionally, providing CDs and customer support adds cost to the overall product and may add additional product development time.

Therefore, it is desirable to find a way to add additional memory without adding additional cost, to store demonstration page information at reduced costs, and to overcome the issues associated with device drivers.

SUMMARY

In view of the challenges in the state of the art, at least some of the embodiments of the present invention are based on the technical problem of providing demonstration pages that are high quality, and do not result in wasted space, or require complex and expensive external modules. In embodiments of the present invention, an imaging device having at least some of the features of the present invention comprises semi-volatile memory to store the temporary demonstration page information and a print module adapted to output the temporary demonstration page information.

In various embodiments, the semi-volatile memory may be semi-volatile NAND flash memory. While semi-volatile NAND flash memory may be described throughout this application for ease of understanding and consistency it should be understood that the embodiments of the invention are not limited to only semi-volatile NAND flash memory. Those of skill in the art will readily understand that the disclosure may be applied to other types of non-volatile memory in addition to semi-volatile NAND flash memory.

In various embodiments, the semi-volatile NAND flash memory may be reused as an alternative to the volatile memory after the demonstration pages are no longer needed. In various other embodiments, the semi-volatile NAND flash memory may be incorporated into a multi-function peripheral and be reused to store facsimile data.

In still other embodiments, the temporary demonstration pages may be transferred out of the semi-volatile NAND flash memory and either transferred back when they are needed, or simply deleted. In circumstances where the demonstration pages are deleted, should they be requested at a later time, they may be downloaded from the internet with or without the knowledge of a user.

An article of manufacture is also provided in accordance with various embodiments of the present invention. The article of manufacture may include a computer readable medium and a plurality of programming instructions stored on the computer readable medium and designed to enable a device to store temporary demonstration page information in a semi-volatile NAND flash memory; and reuse the semi-volatile NAND flash memory as a volatile memory alternative.

In some embodiments, the programming instructions may be further designed to enable the device to transfer the temporary demonstration page information from the semi-volatile NAND flash memory to a separate memory prior to reusing the semi-volatile NAND flash memory.

In some embodiments, the programming instructions may be further designed to enable a device to transfer the temporary demonstration page information from the separate memory location back to the semi-volatile NAND flash memory.

In some embodiments, the programming instructions may be further designed to enable a device to reuse the semi-volatile NAND flash memory to store facsimile data.

In some embodiments, the programming instructions may be further designed to enable a device to retrieve the temporary demonstration page information from a network.

Other features that are considered as characteristic for various embodiments of the present invention are set forth in the appended claims.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION

Figure 1:
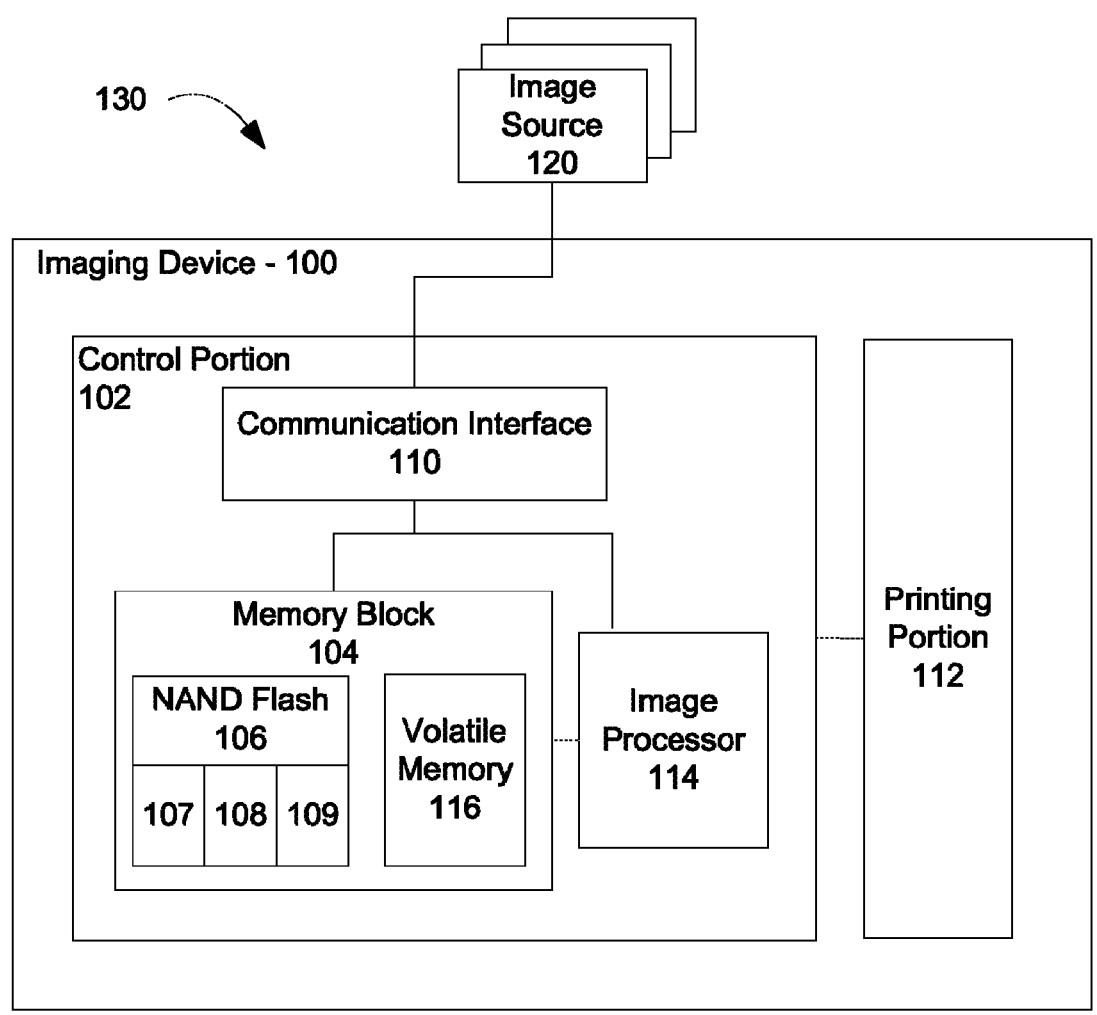
FIG. 1 illustrates a block diagram of an imaging device in accordance with various embodiments of the present invention.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means "(A), (B), (C), (A and B), (A and C), (B and C), or (A, B and C)".

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

NAND flash memory is substantially cheaper per bit than equivalent volatile substitutes, such as DRAM. NAND flash memory, however, has well known limitations which have kept it from becoming a viable substitute for DRAM. One such limitation is that it is has a maximum number of writes allowed to its memory cells. Prior art contains various solutions attempting to minimize this limitation. One solution has been entitled wear leveling or wear averaging. NAND flash memory cells are arranged in a hierarchy. Groups of cells are called pages. Groups of pages are called blocks. Wear leveling refers to tracking how many times a particular memory block has been written and/or erased, and once a block has significantly more writes than other blocks in the same region, utilizing a new block in its place. This effectively attempts to erase all blocks of the memory device an equivalent number of times. While this method may prolong the life of the NAND flash memory, it fails to address its finite number of write cycles.

Semi-volatile NAND flash memory addresses the limitations of NAND flash memory by segregating the cells into three distinct regions. One aspect of the invention is that additional writes beyond the part's rating does not destroy its function, but merely reduces its retention time. By segregating the cells into regions, storage based upon estimated retention times may effectively negate the known limitations of NAND flash. For example, data which is stored for short periods of time may be stored in a region of the semi-volatile NAND flash which has experienced write cycles beyond the part's rating. This not only accomplishes the storage of the data for the short period of time, but also effectively alleviates unnecessary write cycles to other regions in which long term storage may be needed.

In various embodiments of the present invention, methods, apparatuses, and systems for using semi-volatile NAND flash memory in imaging devices are provided. In this manner, better performance and increased functionality, and consequently a more competitive imaging device, may be attained while at a reduced or equivalent cost. The inventive techniques may be implemented in imaging devices such as printers and multi-functional peripherals. Multi-functional peripherals may incorporate copying, facsimile, scanning, and printing functionality, among others.

FIG. 1 is a block diagram schematically illustrating an embodiment of an imaging device arrangement 130. As shown, the imaging device 100 may have a control portion 102 and a printing portion 112. The control portion 102 may further include a communication interface 110, memory block 104, semi-volatile NAND flash memory 106, volatile memory 116, and image processor 114. The imaging arrangement 130 may include any other devices or portions necessary to implement the functionality of either the printers or the multi-function peripherals. The invention is not limited in this regard.

The communication interface 110 may be configured to communicatively couple the control portion 102 of the imaging device 100 to an image source 120. The image source may be any type of device capable of transmitting data related to an image to be printed, faxed, scanned and/or copied. Examples of such an image source 120 include but are not limited to: a general purpose computing device, e.g., a stand alone computing device such as a desktop, a laptop computing device, a mobile computing device, a personal digital assistant, a cellular phone, a scanner, a digital camera, and a storage device designed to store data such as image data.

In various embodiments, the communication interface 110 may transmit the received image data to a memory block 104 directly. Alternatively, the communication interface 110 may transmit the image data to an image processor 114 for processing prior to storing the image data in memory block 104. The image processor 114 may render the received image data into a processed image to facilitate an upcoming printing, scanning, copying, or faxing process, etc. Image processing techniques may include dithering, decompression, half-toning, scaling, noise filtering, sharpening, red-eye removal, color space conversion, and/or color plane separation. The invention is not to be limited in this regard.

In various embodiments, memory block 104 may include volatile memory 116. Volatile memory 116 may be implemented with Dynamic Random Access Memory (DRAM), Static Random Access Memory (SRAM), or any other volatile memory known in the art. The volatile memory may also be implemented as either embedded DRAM or embedded SRAM. Such embodiments may serve to eliminate separate memory modules, thereby reducing the cost and structure required for the memory block 104.

Memory block 104 also includes semi-volatile NAND flash memory 106. Semi-volatile NAND flash memory 106 may be divided into three regions: a high retention region 107, a medium retention region 108, and a low retention region 109. While various embodiments illustrate dividing the semi-volatile NAND flash memory into three regions, it is to be understood that the semi-volatile NAND flash memory may be divided into more or fewer regions of varying sizes. The high retention region 107 may be used to store permanent data that will be needed for the lifetime of the imaging device. Examples of permanent data include firmware code, page count updates, network identification, and/or serial numbers. Due to the necessary long-term retention of the data in the high retention region 107, the high retention region 107 may be written to infrequently. This preserves the ability of the region to store information, and consequently, wear leveling is generally not needed for this portion of the semi-volatile NAND flash memory. As mentioned previously, wear leveling refers to the process whereby the device tracks how many times a memory block has been written and/or erased, and once a block has significantly more writes than other blocks in the same region, utilizing an alternative block.

The medium retention region 108 may be used to store temporary data that must be retained for a period of time while an imaging device may be powered down. In such situations, wear leveling may be needed to track the number of times a block of semi-volatile NAND flash memory has been written and/or erased.

The low retention region 109 may be used to store transient image data, for example, buffered print pages to be transmitted to the printing module 112. Buffered print pages may only need to be stored long enough to be transferred to the printing module. In these situations, assuming the low retention region 109 of the semi-volatile NAND flash has experienced enough write cycles to impact its storage ability, the low retention region may still be utilized to store information, if only for a reduced period of time. The short period of time required for buffering pages, therefore, may exploit this portion of the semi-volatile NAND flash memory. Additionally, due to the low retention region 109 having experienced numerous write cycles which have impacted the durability of the region, wear leveling is helpful to lengthen the semi-volatile NAND flash memory's lifetime. In various embodiments, some uses of the low retention region, such as buffering I/O data, can be implemented as a rotating buffer so that the use of the memory cells in this buffer are evenly divided and no explicit wear leveling algorithm is needed.

In an illustrative embodiment, an imaging device may incorporate duplexing, i.e., printing on both sides of the paper. In prior art devices, large amounts of volatile memory would be necessary to store these multiple pages prior to transmission to the printing module. Utilizing the present invention, the previously required amount of volatile memory is substantially reduced. Because the storage of data for duplexing must only be held for a short period of time, one embodiment of the present invention allows this data to be stored in a low retention region 109 of the semi-volatile NAND flash memory 106. The low retention region may only retain data for short periods of time due to its receiving large numbers of writes. This period of time may be suitable for the device to store the multiple pages of image data necessary for duplexing, and thereby decrease the need for the more expensive volatile memory.

In another illustrative embodiment, an imaging device such as a multi-functional peripheral may incorporate collation. This may require a large number of pages to be scanned into the multifunctional peripheral, stored, and then reordered prior to printing. The volatile memory storage requirements for such functionality have been large in the prior art. Once again, the data may be stored in the low retention region 109 of the semi-volatile NAND flash memory 106, rather than the usual volatile memory equivalent. In still other embodiments, the data stored in the low retention region may be transferred to either the medium retention region or the high retention region when the time required for storing the image data exceeds a certain predetermined time limit, such as in the case of a paper jam or an out of paper event. In various embodiments the predetermined time limit may be estimated based upon the stored number of write cycles to the low retention region. In such a manner, the imaging device may secure the image data for extended periods of time.

In another illustrative embodiment, a multi-function peripheral device which incorporates facsimile functionality may also benefit from use of semi-volatile NAND flash memory. Faxing may require the use of memory for a longer duration than the prior illustrative embodiments. Reasons for an extended duration may include the destination fax being busy, or a fax failing to print upon its receipt, among others. In these situations, the image data may be stored in a medium retention region that is capable of storage for an extended period of time with or without power present to the imaging device.

Since NAND flash memory is substantially cheaper per bit than equivalent volatile substitutes, such as DRAM, a given system may incorporate larger quantities of semi-volatile NAND flash memory. Increases in semi-volatile NAND flash memory, in various embodiments, may allow benefits such as reducing compression requirements, avoiding resolution reduction, and avoiding "racing the marking engine." For example, image data is often compressed on the host before sending it over an I/O channel to the imaging apparatus. This enhances the throughput of the I/O channel as well as reducing the required memory to store the image data. With the increase in semi-volatile NAND flash memory, various embodiments may allow the image data to be transferred in a non-compressed state. This may benefit the CPU because it is no longer required to run unnecessary compression software. Additionally, resolution reduction is avoided. Resolution reduction results from instances where the image data is still too large to fit into the volatile memory after compression. With the substitution of semi-volatile NAND flash memory, more memory is available to store this large amount of image data. Additionally, the semi-volatile NAND flash memory helps the imaging device avoid "racing the marking engine," a situation where the entire page is not buffered before printing. In instances where the image data is too large to buffer in memory, the imaging device begins printing prior to the entire data being received. Given the low cost of semi-volatile NAND flash memory, larger memory blocks become available and issues plaguing prior art systems are thereby negated.

Semi-volatile NAND flash memory may not completely negate the need for volatile memory in every application. In such scenarios, it may, however, facilitate retention of data. For example, in one embodiment the data stored in volatile memory may be transferred to the semi-volatile NAND flash memory for temporary storage. This may allow for storage of the data while the host device is powered down. Alternatively, as a power conservation method, the data may be transferred from the volatile memory into the semi-volatile NAND flash memory while the volatile memory experiences reduced power. Such methods conserve power while retaining the data. Upon a need for the volatile memory, the power may return and the data may be transferred from the semi-volatile NAND flash memory back to the volatile memory.

Figure 2:
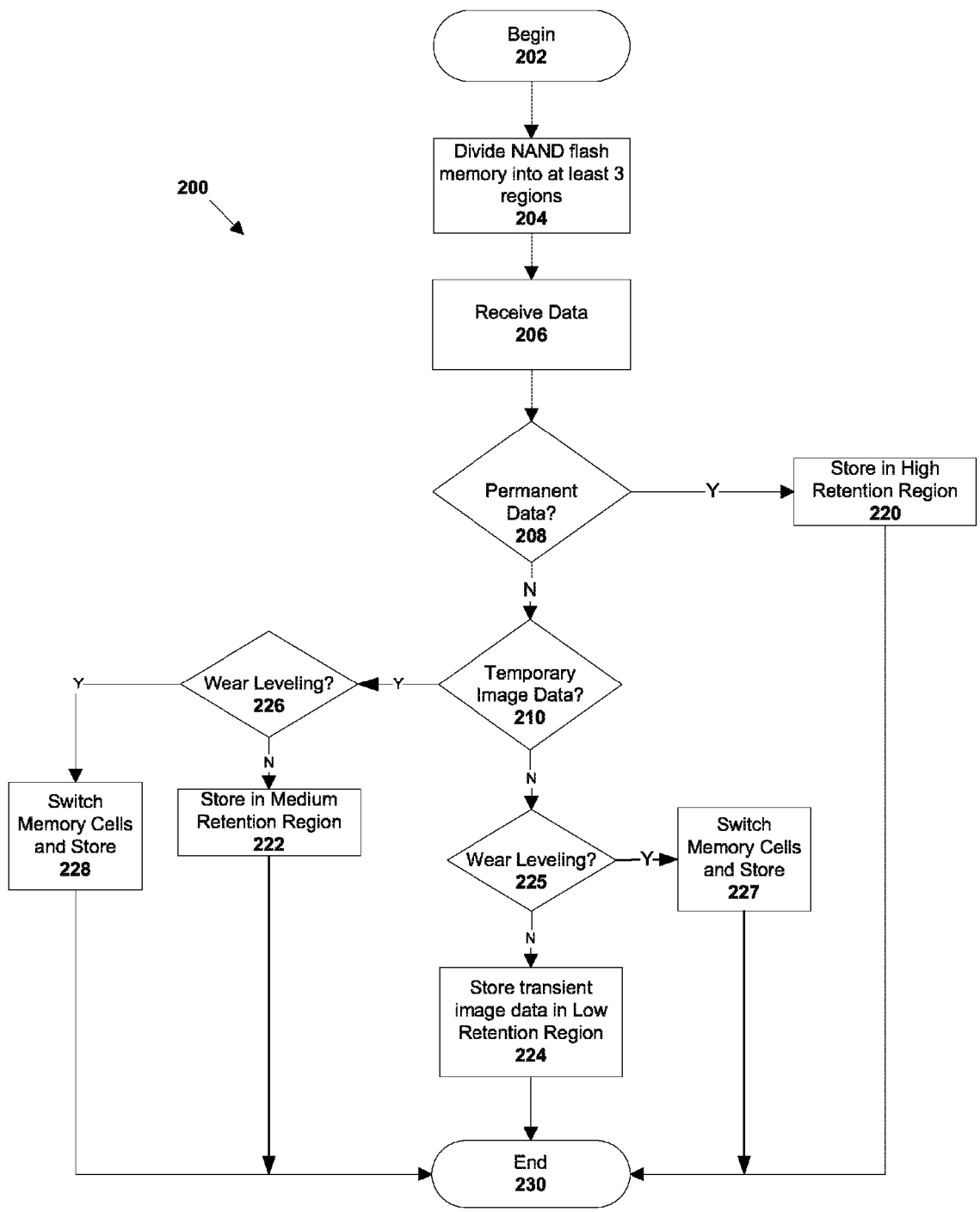
FIG. 2 is a flow diagram illustrating an example method to practice various embodiments of the present invention.

Referring now to FIG. 2, methods, in accordance with various embodiments, are described with reference to a flow diagram. In various embodiments, portions of operations to be performed by a host platform device may constitute state machines or computer programs made up of computer readable instructions. These programming instructions may be maintained in a computer readable medium.

A computer readable medium includes any mechanism that provides (i.e. stores and/or transmits) information in a form readable by a computer. For example, a computer readable medium includes read only memory, random access memory, magnetic disk storage media, optical storage media, flash memory devices, electrical, optical, acoustical or other form of propagated signals (e.g. carrier waves, infrared signals, digital signals), and the like.

Describing the methods by reference to a flow diagram enables one skilled in the art to develop such programs, including instructions to carry out the methods on suitably configured host platforms. In various embodiments, the computer-readable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

The present various embodiments are not described with reference to any particular programming language. It will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or produce a result.

Referring to FIG. 2, a flow diagram describing operations of an imaging device, in accordance with various embodiments of the invention is illustrated. The method begins at block 202 and proceeds to block 204 where the semi-volatile NAND flash memory is divided into three regions. More specifically, the semi-volatile NAND flash memory is divided into a high, medium, and low retention region. While the embodiment describes dividing the semi-volatile NAND flash memory into three regions, it is to be understood that the semi-volatile NAND flash memory may be divided into more or fewer regions of varying sizes depending on, for example, the application.

At block 206, the imaging device receives data. Continuing to block 208, a decision is made whether the received data is permanent data. Examples of permanent data may include firmware code, page count updates, network identification, or a serial number. If the received data is permanent data, at block 220, it is stored in the high retention region and the method ends. If, however, at block 208, it is decided that the data is not permanent data, a decision is made at block 210 to determine if the data is temporary image data.

Temporary image data may be any data that must be retained while the apparatus is powered down or data which requires storing for an extended amount of time. If it is decided at block 210 that the data is temporary image data, an assessment is made at block 226 to determine if wear leveling is needed. Wear leveling may be needed if the number of writes and/or erases to a specific memory block has reached a maximum number. If wear leveling is needed, the process continues to block 228 where a different memory block from the medium retention region is selected and the temporary data is stored therein. After the temporary data has been stored, the method may end. If at block 226 it is determined that no wear leveling is needed, the data is stored in the medium retention region at block 222, and subsequently the method advances to block 230, and ends.

Returning to block 210, if it is determined that the data is not temporary image data, the device recognizes the data as transient image data. At block 225, an assessment is made to determine if wear leveling is needed for the transient image data. If wear leveling is needed, the method may continue to block 227 where a different memory block is selected within the low retention region, and the transient image data is stored therein. The method may subsequently end at block 230. If at block 225 it is determined that no wear leveling is needed, the method may continue to block 224 where the transient data is stored in the low retention region. After storage, the method advances to block 230 and ends.

In various other embodiments, information such as demonstration page information may be stored in the semi-volatile NAND flash. The temporary demonstration page information may be stored in any of the three retention regions as the device is substantially unused, and consequently, able to retain memory in all locations for substantially equal amounts of time. When the temporary demonstration page information is no longer needed, after the imaging device has been sold for instance, the demonstration page information may be removed and the semi-volatile NAND flash memory reused as either non-volatile memory or as an alternative to volatile memory, for example to store facsimile data. In various embodiments, removing the temporary demonstration page information may comprise transferring the temporary demonstration page information to another memory, for example to a host device coupled to the imaging device, prior to reusing the semi-volatile NAND flash memory. In other embodiments, the temporary demonstration page information may be removed from the semi-volatile NAND flash memory, and if requested at a later time, retrieved from a network such as the internet. The temporary demonstration page information may comprise information corresponding to a plurality of demonstration pages and/or pre-computed images.

Figure 3:
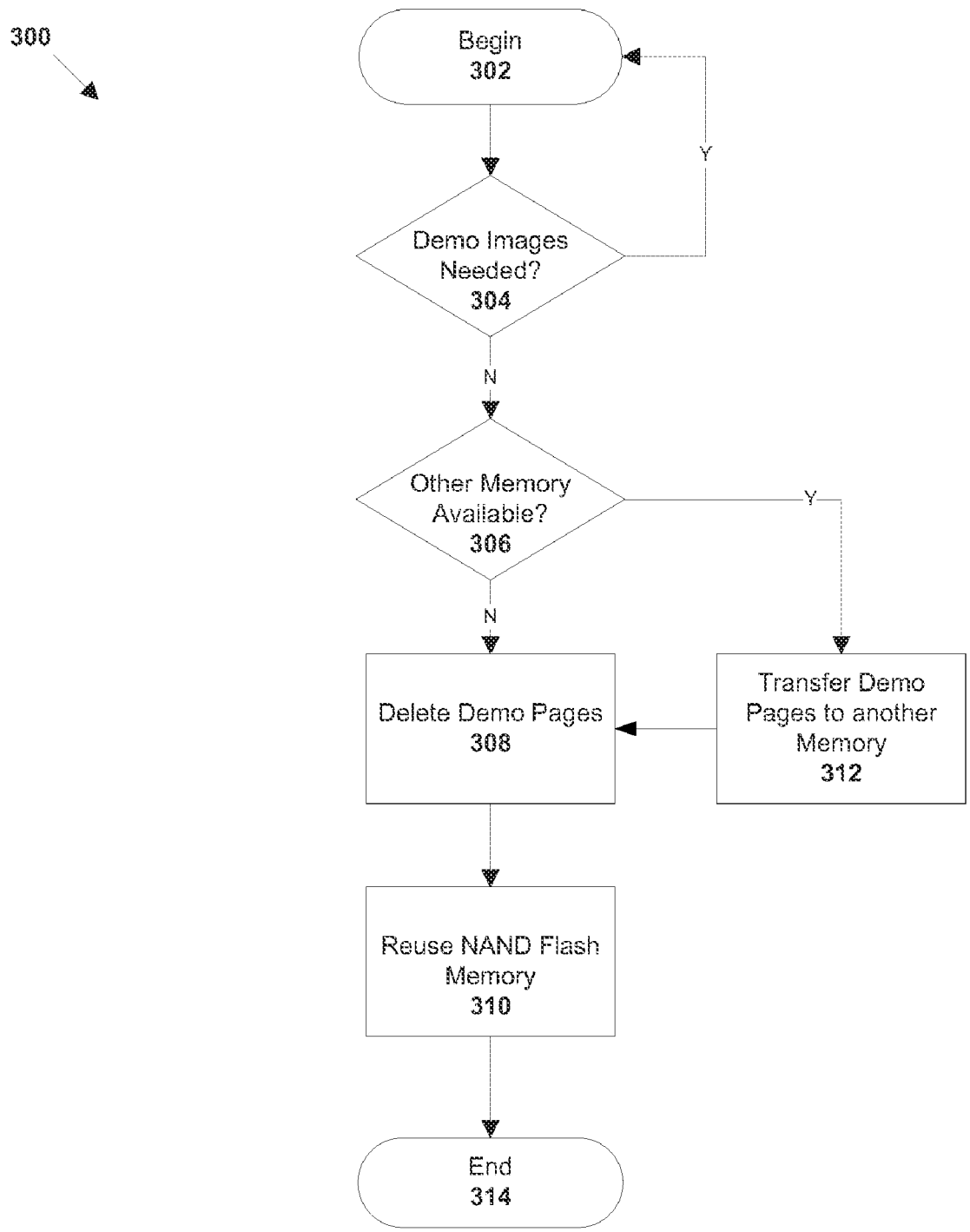
FIG. 3 is a flow diagram illustrating an example method whereby temporary demonstration page information is stored in semi-volatile NAND flash memory and the memory is subsequently reused.

Referring to FIG. 3, a flow diagram describing operations of an imagining device, in accordance with various embodiments of the present invention is illustrated. The method begins at block 302 and proceeds to block 304 where it is determined whether the temporary demonstration page information is still being utilized.

The temporary demonstration page information may be required for the time period preceding the imaging apparatus being coupled to a host device, such as a computer. This time period may end automatically upon connection with a host device, or may end upon the imaging device receiving image data from the host device. If the temporary demonstration page information is still being utilized, the method repeats as indicated by looping back to block 302.

At block 304, if it is decided that the temporary demonstration pages are no longer needed, the method moves to block 306 where it is determined if there is a separate memory available. In various embodiments, the separate memory may be the memory of a host computing device to which the imaging device is coupled or another memory within the imaging device itself. If a separate memory is available, the temporary demonstration page information is transferred to the separate memory at block 312. Once the temporary demonstration page information has been transferred, the method may continue to block 308 where the temporary demonstration pages are deleted. Subsequently, the semi-volatile NAND flash memory may be reused at block 310 and the method may end at block 314.

Alternatively, if at block 306, a separate memory is not available, the temporary demonstration page information may be deleted at block 308 and the semi-volatile NAND flash memory reused at block 310. In various embodiments, deleting the temporary demonstration pages may not allow a user to print the pages at a later time, but in various other embodiments described previously, the demonstration page information may be reacquired from a network such as the internet.

In accordance with various embodiments of the present invention, device driver information may be stored in the semi-volatile NAND flash memory. This may effectively provide a plug and play experience for a user because there is no longer a need to manually install device drivers prior to use of the apparatus.

In one embodiment, an imaging device may support a physical Universal Serial Bus ("USB") which implements two interfaces, a mass storage class interface and a printer class interface. When the imaging device is first plugged into a host's corresponding USB port, the host may recognize the mass storage USB interface and may find the equivalent of an ISO disk image. This ISO image may include an auto-run file which will cause the installation to be launched on the host. This installation may proceed silently if desired or can present options to a user. The installation may also query a live internet connection for any driver updates that may be available. Upon installation, the imaging device may present the printer class interface to the host and begin printing.

In various other embodiments, to save space on the imaging device's semi-volatile NAND flash memory, the stored device driver information may be made smaller by including less functionality, for example, less supported localizations. Should the localizations become needed, they may also be retrieved from a host's internet connection.

In still other embodiments, to save memory on the imaging devices, the NAND flash memory may be reused for other needs after the device driver information has been uploaded to the host. For example, upon the device driver information being uploaded and installed on the host device, the semi-volatile NAND flash memory may be reused to store facsimile data, or as an alternative to volatile memory as discussed above.

In these embodiments, when the device driver information has been removed from the imaging device, a user may later remove the imaging device from the host computer and move it to a different host. In such an instance, it would be necessary to transfer the device driver information back to the device prior to coupling it to the new host. In one embodiment, this may be accomplished by providing a user interface that may interact with a user. The user interface, for example, may include a menu entitled "prepare to move printer." When selected, the device driver information may be downloaded to the imaging device and stored in the semi-volatile NAND flash memory.

In another example, if the imaging device is removed prior to the device driver information being transferred to the semi-volatile NAND flash memory, the user interface may be utilized to display a warning message notifying the user that the imaging device is not prepared to be moved to another system, and to reconnect the imaging device to the previous host. Upon reconnection, the host may transfer the device driver information. Should the semi-volatile NAND flash memory have experienced many write cycles, thereby impacting its storage capabilities, the user may be alerted that the imaging device should be connected to the new host within a short period, such as 24 hours. In various embodiments the device driver information may be stored in other retention regions.

In another embodiment, the device driver information may be transferred back into the semi-volatile NAND flash memory opportunistically. For instance, when the host coupled to the imaging device is shutdown, the process of shutting down may be amended to include transferring the device driver information back into the semi-volatile NAND flash memory. Other opportunistic schedules may also be utilized, for instance, transferring the device driver information to the semi-volatile NAND flash memory when the imaging device has been idle for 24 hours. The device driver information may originate from the host or from a network such as the internet.

Figure 4:
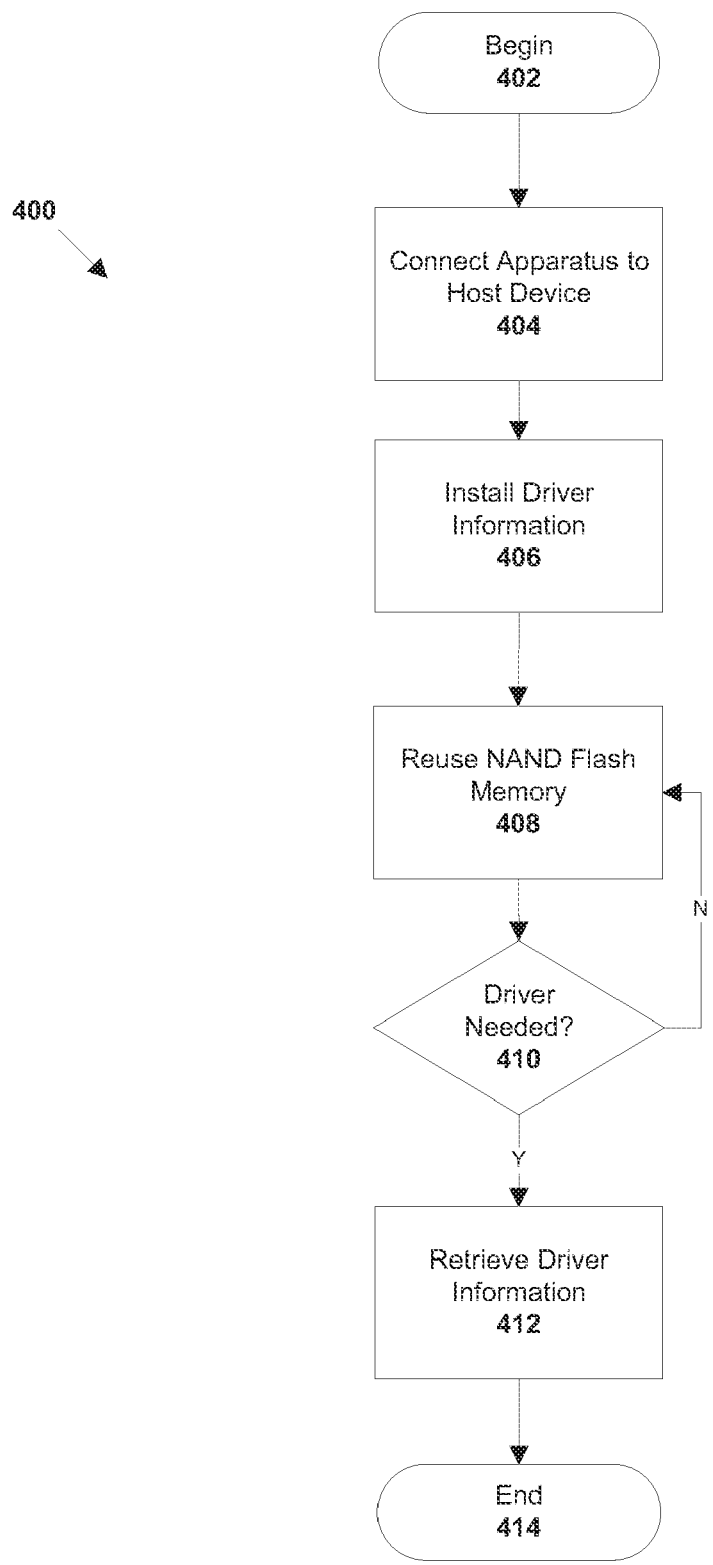
FIG. 4 is a flow diagram illustrating an example method whereby imaging device drivers are stored in the semi-volatile NAND flash memory and the memory is subsequently reused.

Referring now to FIG. 4, a flow diagram illustrating operations of an imaging device, in accordance with various embodiments of the invention is illustrated. The method begins at block 402 and proceeds to block 404 where the imaging apparatus is connected to a host device. Upon connection, the device driver information is installed at block 406, and the semi-volatile NAND flash memory may be reused at block 408. The semi-volatile NAND flash memory may be reused as an alternative to the volatile memory, or reused to store facsimile data.

At block 410, it is decided whether the device driver information is needed. As discussed above, such instances may include the imaging device being moved to another host, a prompt by a user interface, or an opportunistic transfer of the device driver information. If the device driver information is not needed, the method loops back to block 408 where the semi-volatile NAND flash memory may continue to be reused. If the device driver information is needed, the method continues to block 412 where the device driver information is retrieved. The information may be retrieved from the host device, a network connection such as the internet, or other hosts coupled to the imaging device through the network. When the device driver has been successfully retrieved at block 412, the imaging device is capable of being transferred and the method ends at block 414.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. An imaging apparatus comprising:
a first memory configured to initially store temporary demonstration page information;
a second memory; and
a control portion configured to transfer the temporary demonstration page information from the first memory to the second memory,
wherein the control portion is configured to reuse the first memory as a volatile memory alternative subsequent to the temporary demonstration page information being transferred from the first memory to the second memory.

2. The imaging apparatus of claim 1, wherein:
the temporary demonstration page information comprises information data corresponding to one or more demonstration pages; and
the imaging apparatus further comprises a printing portion configured to print, based upon the information data, the one or more demonstration pages.

3. The imaging apparatus of claim 2, wherein:
the control portion is further configured to transfer the temporary demonstration page information from the second memory back to the first memory; and
wherein the printing portion is further configured to print, subsequent to the temporary demonstration page information being transferred from the second memory back to the first memory, the one or more demonstration pages.

4. The imaging apparatus of claim 1, wherein the first memory comprises semi-volatile NAND flash memory.

5. The imaging apparatus of claim 1, wherein the second memory comprises volatile memory.

6. The imaging apparatus of claim 1, wherein:
the imaging apparatus is a multi-function peripheral having facsimile capabilities; and
the first memory is configured to be reused as the volatile memory alternative to store facsimile data.

7. A multi-function peripheral comprising:
a first memory configured to initially store temporary demonstration page information, and wherein the temporary demonstration page information comprises information data corresponding to one or more demonstration pages;
a second memory;
a printing portion configured to print, based upon the information data, the one or more demonstration pages;
a control portion configured to transfer the temporary demonstration page information from the first memory to the second memory;
wherein the control portion is further configured to reuse the first memory as the volatile memory alternative subsequent to the temporary demonstration page information being transferred from the first memory to the second memory,
wherein the control portion is further configured to transfer the temporary demonstration page information from the second memory back to the first memory, and
wherein the printing portion is further configured to print, (i) subsequent to the temporary demonstration page information being transferred from the second memory back to the first memory and (ii) based upon the information data, the one or more demonstration pages.

8. The multi-function peripheral of claim 7, wherein the temporary demonstration page information comprises a plurality of demonstration pages.

9. The multi-function peripheral of claim 7, wherein the first memory comprises semi-volatile NAND flash memory.

10. The multi-function peripheral of claim 7, wherein the second memory comprises volatile memory.

11. The multi-function peripheral of claim 7, wherein:
the multi-function peripheral has facsimile capabilities; and
the first memory is configured to be reused as the volatile memory alternative to store facsimile data.

12. A method comprising:
storing temporary demonstration page information in a first memory of an imaging apparatus, wherein the temporary demonstration page information comprises information data corresponding to one or more demonstration pages;
transferring the temporary demonstration page information from the first memory to a second memory in the imaging apparatus that is separate from the first memory; and
subsequent to transferring the temporary demonstration page information from the first memory to the second memory, reusing the first memory as a volatile memory alternative during use of the imaging apparatus.

13. The method of claim 12, wherein the first memory comprises semi-volatile NAND flash memory.

14. The method of claim 12, further comprising:
subsequent to reusing the first memory as the volatile memory alternative, transferring the temporary demonstration page information from the second memory back to the first memory; and
(i) subsequent to the temporary demonstration page information being transferred from the second memory back to the first memory and (ii) based upon the information data, printing the one or more demonstration pages corresponding to the temporary demonstration page information.

15. The method of claim 12, wherein the first memory is reused, as the volatile memory alternative, to store facsimile data.

* * * * *